(12) United States Patent
Rohde et al.

(10) Patent No.: US 11,299,144 B2
(45) Date of Patent: Apr. 12, 2022

(54) METHOD FOR PROVIDING VEHICLE-TRAJECTORY INFORMATION AND METHOD FOR LOCATING A POTHOLE

(71) Applicant: Robert Bosch GmbH, Stuttgart (DE)

(72) Inventors: Jan Rohde, Stuttgart (DE); Martin Mueller, Bad Cannstatt (DE); Michael Pagel, Bad Liebenzell (DE); Philipp Lehner, Muehlacker (DE); Volker Hofsaess, Moeglingen (DE); Gernot Schroeder, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 312 days.

(21) Appl. No.: 16/095,508

(22) PCT Filed: Mar. 23, 2017

(86) PCT No.: PCT/EP2017/056936
§ 371 (c)(1),
(2) Date: Oct. 22, 2018

(87) PCT Pub. No.: WO2017/202522
PCT Pub. Date: Nov. 30, 2017

(65) Prior Publication Data
US 2020/0353915 A1 Nov. 12, 2020

(30) Foreign Application Priority Data
May 23, 2016 (DE) .......................... 102016208883.1

(51) Int. Cl.
*B60W 30/09* (2012.01)
*B60W 30/095* (2012.01)
(Continued)

(52) U.S. Cl.
CPC ........ *B60W 30/09* (2013.01); *B60W 30/0956* (2013.01); *G01C 21/3492* (2013.01); *G08G 1/165* (2013.01); *G05D 1/0214* (2013.01)

(58) Field of Classification Search
CPC .. B60W 30/09; B60W 30/0956; B60W 10/00; B60W 60/00276; B60W 2300/00;
(Continued)

(56) References Cited

U.S. PATENT DOCUMENTS 6,628,804 B1 * 9/2003 Edanami ................. G01P 3/806
382/104
7,421,334 B2 9/2008 Dahlgren et al.
(Continued)

FOREIGN PATENT DOCUMENTS

DE 102014207084 A1 10/2015
EP 2687818 A2 1/2014
(Continued)

OTHER PUBLICATIONS

International Search Report for PCT/EP2017/056936, dated Jun. 8, 2017.

*Primary Examiner* — Donald J Wallace
(74) *Attorney, Agent, or Firm* — Norton Rose Fulbright US LLP; Gerard Messina

(57) ABSTRACT

A method for providing vehicle-trajectory information. The method includes a read-in task, in which at least one item of inertial information is read in that indicates at least one parameter of a movement of a vehicle during travel. In addition, the method includes an acquisition task, in which location information is acquired that indicates the position of the vehicle during the movement. In a last determination task, the vehicle-trajectory information is determined using (Continued)

the inertial information and the location information, the vehicle-trajectory information representing the movement of the vehicle at the position.

20 Claims, 3 Drawing Sheets

(51) Int. Cl.
  *G01C 21/34* (2006.01)
  *G08G 1/16* (2006.01)
  *G05D 1/02* (2020.01)

(58) Field of Classification Search
  CPC ..... B60W 2530/213; B60W 2540/041; B60W 2540/049; B60W 2552/00; B60W 2556/65; B60W 2710/00; B60W 2720/406; B60W 2754/00; B60W 2900/00; B60W 30/08; B60W 30/0953; G08G 1/0968; G08G 1/165; G08G 1/20; G05D 1/0214; G01C 21/3492; G01C 21/16; G01C 21/10; G01C 21/12; G01C 21/38; G01C 21/3804
  See application file for complete search history.

(56) References Cited

U.S. PATENT DOCUMENTS

| | | | | |
|---|---|---|---|---|
| 7,778,753 B2* | 8/2010 | Fujiwara | ............... | B60W 40/02 701/41 |
| 8,825,265 B1* | 9/2014 | Ferguson | ............. | G05D 1/0287 701/26 |
| 9,632,502 B1* | 4/2017 | Levinson | ............... | G06N 20/00 |
| 9,989,629 B1* | 6/2018 | LaChapelle | ........... | G01S 7/4816 |
| 10,121,813 B2* | 11/2018 | Eichenholz | .............. | G01S 17/10 |
| 10,267,899 B2* | 4/2019 | Weed | .................... | G01S 7/4817 |
| 10,551,501 B1* | 2/2020 | LaChapelle | ........... | G01N 21/47 |
| 10,627,516 B2* | 4/2020 | Eichenholz | .............. | G01S 17/87 |
| 2002/0121989 A1* | 9/2002 | Burns | ............... | G08G 1/096888 340/901 |
| 2009/0097038 A1 | 4/2009 | Higgins-Luthman et al. | | |
| 2010/0076625 A1* | 3/2010 | Yoeli | .................... | B64C 13/044 701/4 |
| 2012/0143489 A1 | 6/2012 | Lee et al. | | |
| 2013/0006448 A1* | 1/2013 | Callou | .................... | A63H 27/12 701/5 |
| 2015/0012165 A1 | 1/2015 | Israelsson | | |
| 2015/0100194 A1* | 4/2015 | Terada | ................. | G05D 1/0214 701/25 |
| 2016/0375766 A1* | 12/2016 | Konet | ....................... | G06T 7/70 348/148 |
| 2017/0024938 A1* | 1/2017 | Lindsay | ................ | B60W 40/10 |
| 2017/0083021 A1* | 3/2017 | Balaghiasefi | ........ | G05D 1/0223 |
| 2017/0247040 A1* | 8/2017 | Miller | ................. | B60W 30/182 |
| 2017/0248695 A1* | 8/2017 | Suarez | ................. | G01S 13/003 |
| 2017/0248951 A1* | 8/2017 | Perkins | ................ | G05D 1/0061 |
| 2017/0248952 A1* | 8/2017 | Perkins | ................ | G05D 1/0061 |
| 2017/0248953 A1* | 8/2017 | Kelley | .................. | B60W 50/08 |
| 2017/0249844 A1* | 8/2017 | Perkins | ................. | B60W 40/00 |
| 2018/0284234 A1* | 10/2018 | Curatu | ................... | G05D 1/024 |

FOREIGN PATENT DOCUMENTS

| | | |
|---|---|---|
| JP | 2008134754 A | 6/2008 |
| JP | 2015064786 A | 4/2015 |
| JP | 2015194463 A | 11/2015 |

* cited by examiner

METHOD FOR PROVIDING VEHICLE-TRAJECTORY INFORMATION AND METHOD FOR LOCATING A POTHOLE

FIELD OF THE INVENTION

The approach is based on an apparatus or a method according to the species defined in the independent claims. The subject matter of the present approach is also a computer program.

BACKGROUND INFORMATION

Knowledge of potholes is of interest both for infrastructure managers such as cities and municipalities as well as for individual drivers. For infrastructure managers, this information is relevant in order to determine the condition of roads/bridges and, if necessary, to initiate short-term repair measures or maintenance measures. Without prior information about possible infrastructure damage, it is necessary to drive over and check large parts of or the entire infrastructure.

Patent document U.S. 2009/0097038 A1 discusses recognition of potholes with the aid of video recognition.

SUMMARY OF THE INVENTION

Against this background, with the approach presented here, a method for providing vehicle-trajectory information and a method for locating a pothole, as well as an apparatus which uses the methods, and finally a corresponding computer program according to the main claims are introduced. Advantageous further developments of and improvements to the methods set forth in the independent claims are made possible by the measures delineated in the dependent claims.

The advantages achievable with the approach presented here are that positions of potholes are able to be indicated for a driver of a vehicle, even without close proximity of the vehicle to the potholes. Thus, the driver is able to be informed early on about the potholes prior to an upcoming passage over them.

A method is introduced for providing vehicle-trajectory information. The method includes a read-in step, in which at least one item of inertial information is read in that indicates at least one parameter of a movement of a vehicle during travel. In addition, the method includes a read-in step, in which an item of location information is acquired that indicates the position of the vehicle during the movement. In a determination step, the vehicle-trajectory information is determined using the inertial information and the location information, the vehicle-trajectory information representing the movement of the vehicle at the position.

For example, this method may be implemented in software or hardware or in a mixed form of software and hardware, e.g., in a control unit.

The vehicle-trajectory information determinable with the aid of the method may be used in a further method, for example, for comparison to reference information. For instance, if the reference information represents a predetermined movement of the vehicle at the position in the case of a roadway free of potholes, the result of the comparison of the vehicle-trajectory information to the reference information may give indication of whether or not there are potholes at the positions of the vehicle-trajectory information.

The parameter may indicate a horizontal movement; this may be caused, for example, by an evasive movement such as a steering motion by the driver of the vehicle in order to avoid a pothole.

According to one specific embodiment, additionally or alternatively, the parameter may indicate a vertical movement of the vehicle. For example, the vertical movement may be caused during a braking motion and/or during a deflection motion as the vehicle goes through a pothole.

The location information may represent a position determined with the aid of a GPS sensor, for instance. The Global Positioning System GPS is known and adopted widely for determining position.

The approach introduced here also provides an apparatus which is configured to carry out, control or implement the steps of a variant of a method presented here for providing vehicle-trajectory information, in suitable devices. The object of the approach may be achieved quickly and efficiently by this embodiment variant of the approach in the form of an apparatus, as well.

In one advantageous development, a provision device is controlled by the apparatus. To that end, for example, the apparatus is able to access sensor signals such as inertial signals and locating signals. The control is accomplished via actuators such as an inertial sensor and a locating sensor like, for example, a GPS sensor.

A method is introduced for locating a pothole. The method includes a read-in step, in which a first item of vehicle-trajectory information is read in that represents a first movement of a first vehicle at a position. In a further read-in step, at least one second item of vehicle-trajectory information is read in that represents a second movement of the first vehicle or of a second vehicle at the position. Since it is unlikely that the first movement and the second movement would take place at exactly the same position, the position may represent a defined road section, for example. In a comparison step, the first item of vehicle-trajectory information is compared to at least one item of reference-trajectory information, in order to determine a first item of pothole information. In addition, in a comparison step, the second item of vehicle-trajectory information is compared to the at least one item of reference-trajectory information, in order to determine a second item of pothole information. In a last providing step, if the first pothole information and the second pothole information indicate a pothole, locating information is provided which indicates a position of a located pothole.

The method presented is able to already recognize positions of road-surface breakups prior to their perceptibility by sensors of vehicles, for example, and is then able to make these positions available, e.g., to vehicle systems of vehicles with the aid of the locating information.

An item of reference-trajectory information may represent a predetermined movement of the vehicle at the position in the event a roadway is free of potholes; in this case, if the first item of vehicle-trajectory information and/or the second item of vehicle-trajectory information do not agree, advantageously within a tolerance range, with the reference-trajectory information in the comparison, the first item of pothole information and/or the second item of pothole information is/are determined. The locating information is provided in this case if both the result of the comparison of the first item of vehicle-trajectory information to the reference-trajectory information as well as the result of the comparison of the second item of vehicle-trajectory information to the reference-trajectory information indicate no agreement.

An item of reference-trajectory information may also represent an avoidance trajectory which, for example, may be produced by a steering motion on the part of the driver. In this case, the first item of pothole information and/or the second item of pothole information is/are determined, if the first item of vehicle-trajectory information and/or the second item of vehicle-trajectory information agrees with the reference-trajectory information in the comparison. In this case, the locating information is provided, if both the result of the comparison of the first item of vehicle-trajectory information to the reference-trajectory information as well as the result of the comparison of the second item of vehicle-trajectory information to the reference-trajectory information indicate an agreement.

Alternatively or in addition to the avoidance trajectory, an item of reference-trajectory information may also represent a pothole drive-through trajectory which, for example, may be produced by a deflection when going through a pothole or by a braking of the vehicle. In this case, the locating signal is provided as described on the basis of the avoidance trajectory.

The first item of vehicle-trajectory information and/or the second item of vehicle-trajectory information of the method for locating a pothole may advantageously be one of the items of vehicle-trajectory information provided with the aid of one of the methods presented for providing vehicle-trajectory information.

The approach introduced here also provides an apparatus which is configured to carry out, control or implement the steps of a variant of a method presented here for locating a pothole, in suitable devices. The object of the approach may be achieved quickly and efficiently by this embodiment variant of the approach in the form of an apparatus, as well.

To that end, the apparatus may have at least one arithmetic logic unit for the processing of signals or data, at least one memory unit for storing signals or data, at least one interface to a sensor or an actuator for reading in sensor signals from the sensor or for the output of data signals or control signals to the actuator and/or at least one communication interface for the read-in or output of data which are embedded into a communication protocol. The arithmetic logic unit may be a signal processor, a microcontroller or the like, for example, while the memory unit may be a flash memory, an EPROM or a magnetic memory unit. The communication interface may be configured to read in or output data in wireless and/or conducted fashion, a communication interface which is able to read in or output conducted data having the capability to read in this data electrically or optically from a corresponding data-transmission line, for example, or output it into a corresponding data-transmission line.

In the present case, an apparatus may be understood to be an electrical device which processes sensor signals and outputs control signals and/or data signals as a function thereof. The apparatus may have an interface which may be implemented in hardware and/or software. If implemented in hardware, the interfaces may be part of what is referred to as a system ASIC, for example, that includes a wide variety of functions of the apparatus. However, it is also possible that the interfaces are separate integrated circuits or are made up at least partially of discrete components. If implemented in software, the interfaces may be software modules which are present on a microcontroller, for example, in addition to other software modules.

In one advantageous development, a locating device is controlled by the apparatus. To that end, for example, the apparatus is able to access sensor signals such as a first vehicle-trajectory signal, a second vehicle-trajectory signal and a reference-trajectory signal. The control is accomplished via actuators such as a vehicle-trajectory interface, a reference-trajectory interface and a comparison unit.

Of advantage is also a computer-program product or computer program having program code that may be stored on a machine-readable carrier or storage medium such as a semiconductor memory, a hard disk memory or an optical memory and is used to carry out, implement and/or control the steps of the method according to one of the specific embodiments described above, especially when the program product or program is executed on a computer or an apparatus.

Exemplary embodiments of the approach presented here are represented in the drawing and explained in greater detail in the following description.

In the following description of advantageous exemplary embodiments of the present approach, the same or similar reference numerals are used for the similarly functioning elements shown in the various figures, a repeated description of these elements being omitted.

DETAILED DESCRIPTION

Figure 1:
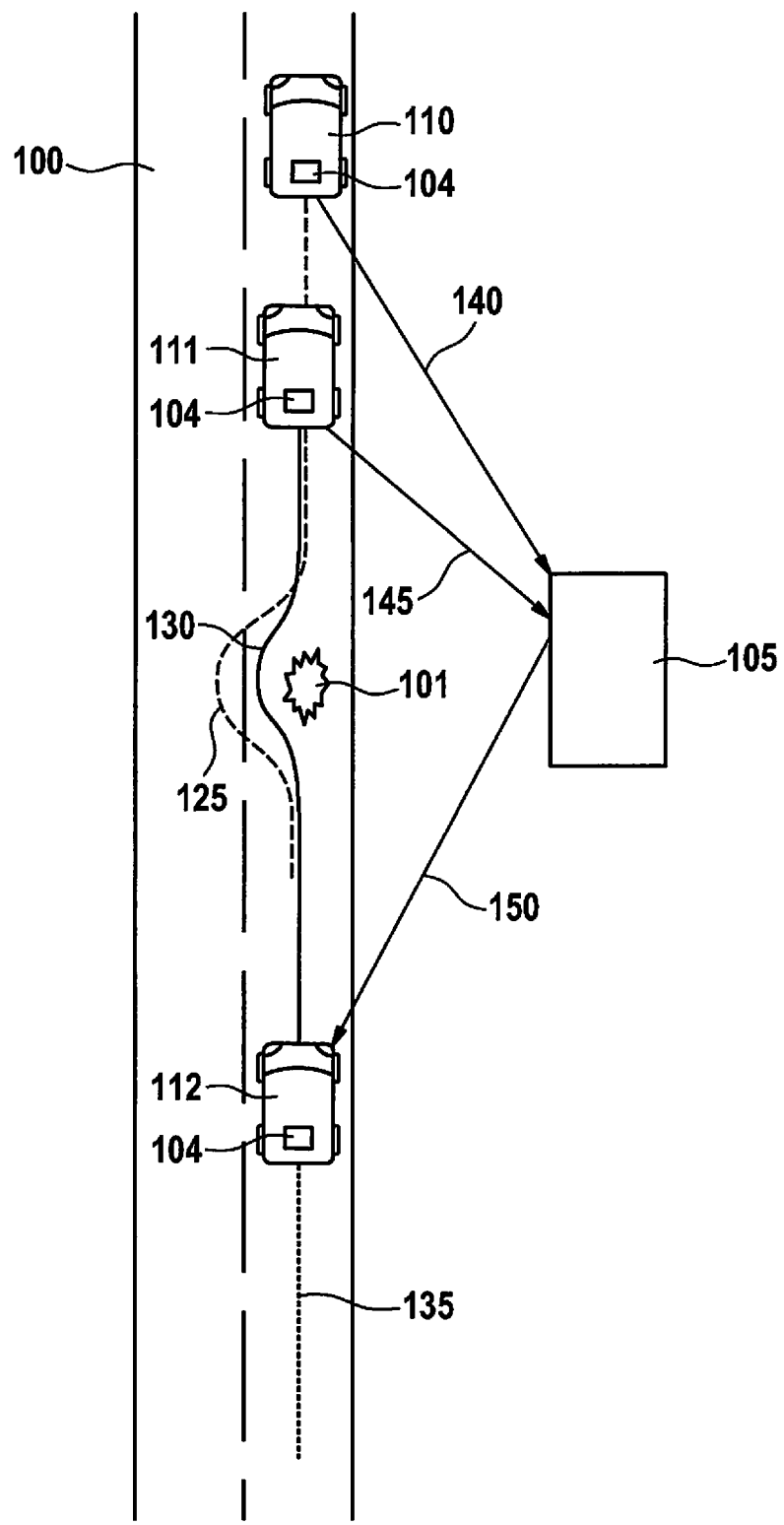
FIG. 1 shows a schematic representation of a scenario for locating a pothole according to one exemplary embodiment.

FIG. 1 shows a schematic representation of a scenario for locating a pothole 101 on a roadway 100 according to one exemplary embodiment.

In order to locate pothole 101, a system is used made up of a plurality of apparatuses 104, 105, apparatuses 104 in each case being apparatuses disposed in a vehicle 110, 111, 112, and apparatus 105 being a stationary apparatus, for example. The number of apparatuses 104 in this context is arbitrary. The system may also include only one apparatus 104. In this case, apparatus 105 may be disposed in the same vehicle 110, 111, 112 as apparatus 104. Apparatus 105 is connected to apparatus(es) 104 via a radio link, for example, in a manner allowing the transmission of signals.

According to this exemplary embodiment, three apparatuses 104 are shown, which are situated in a first vehicle 110, a second vehicle 111 and a third vehicle 112. Vehicles 110, 111, 112 are driving on roadway 100 which has pothole 101. According to this exemplary embodiment, first vehicle 110 and second vehicle 111 have already passed pothole 101. A first vehicle trajectory 125 of first vehicle 110, shown with a dashed line according to this exemplary embodiment, indicates that in the area of pothole 101, first vehicle 110 executed a movement in the form of an evasive movement in order to avoid pothole 101. A second vehicle trajectory 130 of second vehicle 111, shown with a solid line according to this exemplary embodiment, indicates that second vehicle 111 likewise executed an evasive movement in the area of pothole 101, in order to avoid pothole 101. A third vehicle trajectory 135 of third vehicle 112, shown with a dotted line according to this exemplary embodiment, which has not yet reached pothole 101, is currently still proceeding straight.

By comparing a section of vehicle trajectories 125, 130 in the area of pothole 101, to at least one reference trajectory existing for the roadway section in which pothole 101 is located, it is possible to infer the presence of pothole 101. Apparatus 105 is provided for a corresponding evaluation of vehicle trajectories 125, 130.

In the following, the locating of pothole 101 with the aid of apparatuses 104 of vehicles 110, 111, which have already passed pothole 101, is described. Each apparatus 104 is configured to provide vehicle-trajectory information 140, 145. To that end, in each instance, apparatuses 104 are configured to read in at least one item of inertial information that indicates at least one parameter of a movement of respective vehicle 110, 111 during travel. For example, in each case the inertial information is read in via an interface to an inertial sensor of vehicles 110, 111. According to this exemplary embodiment, the parameters are selected in such a way that at least the evasive movements described for circumventing pothole 101 are able to be represented by the inertial information. Furthermore, apparatuses 104 are configured to read in location information which indicates the position of respective vehicle 110, 111 during the movement represented by the inertial information. For example, in each case the location information is read in via an interface to a position-detection sensor or a navigation system. Each of apparatuses 104 is configured, using the respective inertial information and the respective location information, to determine vehicle-trajectory information 140, 145, which indicates the movement of vehicle 110, 111 in the area of the position defined by the location information. According to this exemplary embodiment, apparatus 104 of first vehicle 110 is configured to provide first vehicle-trajectory information 140 and apparatus 104 of second vehicle 111 is configured to provide second vehicle-trajectory information 145.

Apparatus 105 is configured to locate pothole 101 on the basis of vehicle-trajectory information 140, 145, which is made available by at least one apparatus 104. In the scenario shown in FIG. 1, apparatus 105 receives vehicle-trajectory information 140, 145 from vehicles 110, 111 which have just passed pothole 101, and uses it to locate pothole 101, for example, by carrying out a method described below with the aid of FIG. 3.

According to one exemplary embodiment, apparatus 105 is configured to provide locating information 150 which indicates the position of a located pothole 101. For example, locating information 150 may be used by a highway authority, in order to become informed about pothole 101. In addition, locating information 150 may be used to warn vehicles 112, which are using roadway 100 and are approaching pothole 101, about pothole 101.

According to this exemplary embodiment, apparatus 104 of vehicle 112 is configured to read in locating information 150. This locating information, according to this exemplary embodiment, is able to warn the driver of third vehicle 112 about upcoming pothole 101. To that end, apparatus 104 and/or a further apparatus, which is or may be situated in vehicle 112, may have a warning device, for example, for the output of an acoustic and/or visual warning signal.

In the following, an exemplary embodiment is described in greater detail with reference to FIG. 1.

A server in the form of further apparatus 105 gathers trajectories in the form of first vehicle-trajectory information 140 and second vehicle-trajectory information 145 from vehicles 110, 111 with data from an inertial sensor system. First vehicle trajectory 125 and second vehicle trajectory 130 evade pothole 101. According to an alternative exemplary embodiment, in the case of a non-evasive vehicle trajectory, a pothole 101 may be inferred based on an acceleration in the z-direction, thus, a vertical motion of the vehicle.

The present approach is used to recognize potholes 101 in order to reduce costs for infrastructure maintenance, to increase driving comfort and to reduce the wear on vehicles 110, 111, 112. To that end, data from GPS sensors and inertial sensors, for instance, which according to this exemplary embodiment, was acquired by a vehicle sensor system of apparatuses 104 of vehicles 110, 111, 112, or according to an alternative exemplary embodiment, with the aid of mobile terminals, is read in by further apparatus 105. For instance, further apparatus 105 may be a central server/backend server which gathers and aggregates vehicle-trajectory information 140, 145, and from it, derives the position of potholes 101. The sensor system for acquiring vehicle-trajectory information 140, 145 may either be installed permanently in vehicle 110, 111, 112, or it may come from a mobile terminal, e.g., a smartphone. In this context, data like the position, which may be determinable with the aid of geographic coordinates such as longitude and latitude, and the movement, e.g., a velocity of vehicle 110, 111, 112 and/or acceleration signals, are used.

With the position, vehicle-trajectory information 140, 145 may be determined. By aggregating a great deal of vehicle-trajectory information 140, 145 on the central server, it is possible to recognize whether an evasive maneuver always takes place at certain positions, for example. In addition, based on collected velocities, it is possible to recognize whether a reduction in velocity also takes place at these positions. Acceleration sensors furnish a further source of information. When going through a pothole 101, they indicate a deflection. By a comparison, executable by further apparatus 105, with existing reference-trajectory information, e.g., in the form of map material, described in greater detail with the aid of FIG. 3, known infrastructure elements may be ruled out. Because a great deal of read-in vehicle-trajectory information 140, 145 is evaluated by further apparatus 105, temporary events are able to be ruled out.

Significant advantages of the approach are that it is no longer necessary for institutions responsible for the maintenance of roadways 100 to drive over and check large sections or the entire infrastructure. This is accompanied by a reduction in costs, thanks to low personnel and non-personnel costs. In addition, road damage like potholes 101 increases the danger of traffic accidents. To avoid this, potholes 101 should be recognized and remedied early on. The approach presented permits this very thing and therefore contributes to increased traffic safety. The individual driver is interested in information such as locating information 150 about potholes 101, in order to possibly guide his route selection over sections having very few potholes 101, or to avoid them ahead of time, that is, prior to perceiving them visually. In particular, driving comfort is thereby increased, and the stress on vehicle 110, 111, 112 is influenced advantageously.

Figure 2:
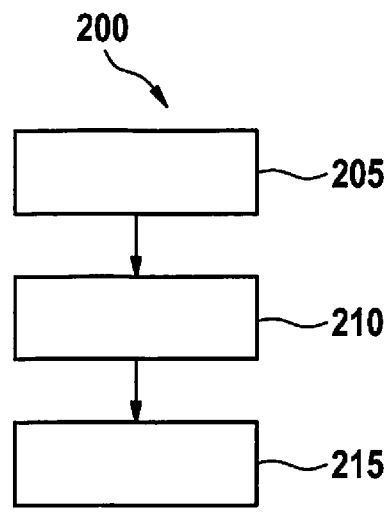
FIG. 2 shows a flowchart of a method for providing vehicle-trajectory information according to one exemplary embodiment.

FIG. 2 shows a flowchart of a method 200 for providing vehicle-trajectory information according to one exemplary embodiment. It may be a method 200 which is executable and/or controllable by one of the apparatuses described with reference to FIG. 1. In a read-in step 205, at least one item of inertial information is read in that indicates at least one parameter of a movement of a vehicle during travel. In a read-in step 210, an item of location information is acquired which indicates the position of the vehicle during the movement. In a last determination step, the vehicle-trajectory information is determined using the inertial information and the location information, the vehicle-trajectory information representing the movement of the vehicle at the position.

Figure 3:
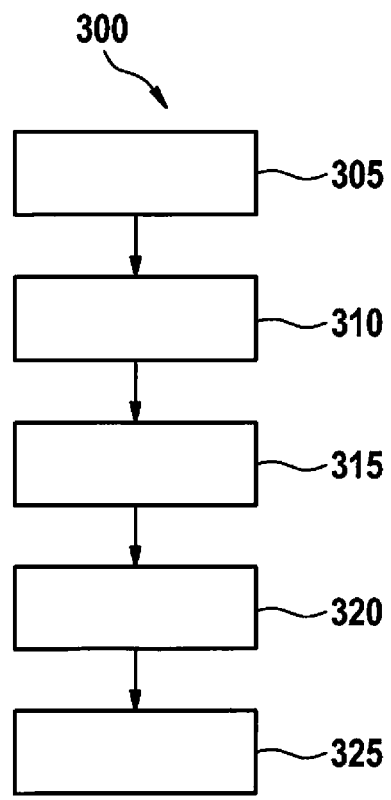
FIG. 3 shows a flowchart of a method for locating a pothole according to one exemplary embodiment.

FIG. 3 shows a flowchart of a method 300 for locating a pothole according to one exemplary embodiment. It may be a method 300 which is executable and/or controllable by the further apparatus described with reference to FIG. 1.

In a read-in step 305, an item of vehicle-trajectory information is read in that represents a first movement of a first vehicle at a position. In a further read-in step 310, a second item of vehicle-trajectory information is read in that represents a second movement of the first vehicle or of a second vehicle at the position. In a comparison step 315, the first vehicle-trajectory information is compared to an item of reference-trajectory information, in order to determine a first item of pothole information. In a further comparison step 320, the second vehicle-trajectory information is compared to the reference-trajectory information, in order to determine a second item of pothole information. In a last providing step 325, if the first pothole information and the second pothole information indicate a pothole, locating information is provided which indicates a position of a located pothole.

In the following, method 300 is described again in greater detail:

First of all, data in the form of the vehicle-trajectory information from GPS- and inertial sensor systems is stored as a function of travel on a central server, for example. This vehicle-trajectory information is summarized for road sections, and an aggregated trajectory is derived from the vehicle-trajectory information. If, based on multiple items of vehicle-trajectory information, an avoidance maneuver can always be recognized at the same position, it is indicative of a pothole. In addition, the velocity information is evaluated. If a reduction in velocity at the positions described above can also be identified over several drive-throughs, this is a further indication of a pothole. Furthermore, the evaluation of the acceleration sensor system of the vehicle furnishes a strong indication of a pothole. If no avoidance maneuver, but instead a deflection of the acceleration sensors can be recognized at this position, this points to a pothole. Thereupon, according to one exemplary embodiment, a comparison is carried out with existing reference information of available map material, for example, in order to rule out known infrastructure elements such as a speed bump or a bottleneck. Furthermore, it is possible to take into account the sensor data of the steering angle for a deflection accurate in terms of geo-position. In this method 300, not only individual sensor information is evaluated, but rather a great deal of vehicle-trajectory information that is gathered and aggregated on the central server, for example.

The method presented may be used, e.g., in systems for automatic driving, in driver assistance systems, in route planning or in information systems.

Figure 4:
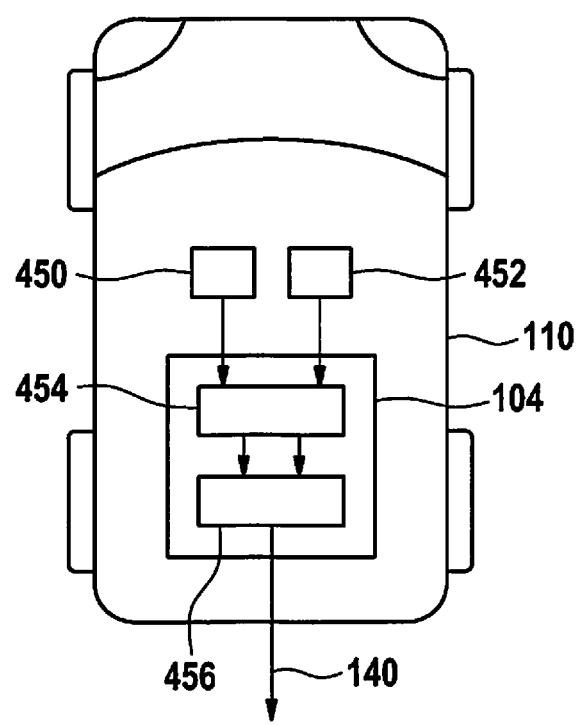
FIG. 4 shows a schematic representation of an apparatus for providing vehicle-trajectory information according to one exemplary embodiment.

FIG. 4 shows a vehicle 110 having an apparatus 104 for providing vehicle-trajectory information 140 according to one exemplary embodiment. It may be a vehicle described with the aid of FIG. 1.

A device 450 for acquiring and providing inertial information is mounted or integrated in vehicle 110. Device 450 may also be part of apparatus 104. Device 450 is configured to detect accelerations acting on device 450, e.g., in the x-direction and/or in the y-direction and/or in the z-direction and/or around at least one axis of rotation of apparatus 104, and to provide this as inertial information.

Also disposed in vehicle 110 is a device 452 for determining a position of vehicle 110 during the acquisition of inertial information. Device 452 may also be part of apparatus 104. Device 452 is configured to determine the position of vehicle 110 and provide it as location information.

Apparatus 104 has a read-in device 454, which is configured for the inertial information and the location information. Apparatus 104 also has a determination device 456, which is configured to link the inertial information and the location information together, and to determine vehicle-trajectory information 140 from the linkage of the inertial information and the location information. Vehicle-trajectory information 140 indicates a movement of vehicle 110, defined by the inertial information, in a section, determined by the location information, of a roadway traveled by vehicle 110.

Figure 5:
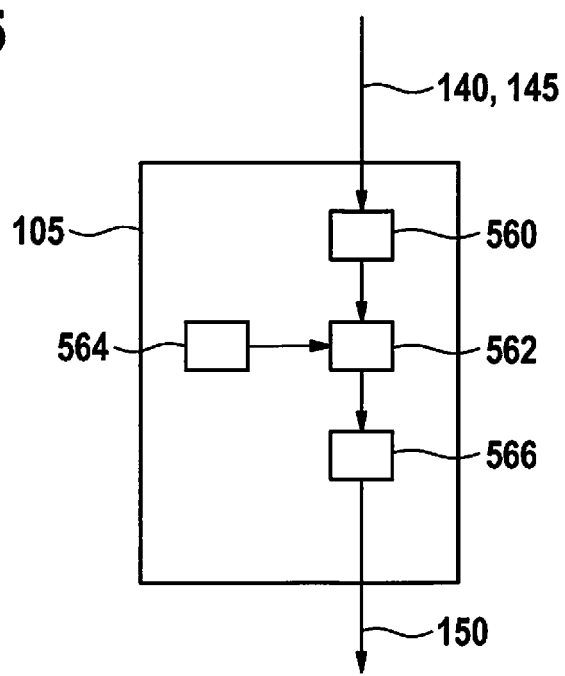
FIG. 5 shows a schematic representation of an apparatus for locating a pothole according to one exemplary embodiment.

FIG. 5 shows an apparatus 105 for locating a pothole according to one exemplary embodiment. It may be apparatus 105 described with the aid of FIG. 1.

Apparatus 105 is configured to locate a pothole using supplied vehicle-trajectory information 140, 145, and to provide locating information 150 that indicates a position of the pothole and, optionally, a property such as a depth or size of the pothole.

Vehicle-trajectory information 140, 145 may be supplied by an apparatus 104, as described with the aid of FIG. 4.

Apparatus 105 has a read-in device 560, which is configured to read in vehicle-trajectory information 140, 145 supplied to apparatus 105. Apparatus 105 also has a comparison device 562 that is configured to compare read-in vehicle-trajectory information 140, 145, which is assigned to a section of a roadway indicated by vehicle-trajectory information 140, 145, to at least one item of reference-trajectory information that is assigned to the same section of the same roadway. Reference-trajectory information may represent a sequence of movements of the vehicle in the section in relation to the x-axis and/or the y-axis and/or the z-axis and/or in relation to at least one axis of rotation of the vehicle. According to this exemplary embodiment, the reference-trajectory information is provided, merely by way of example, by a memory device 564 of apparatus 105. Comparison device 562 is configured, for each comparison of vehicle-trajectory information 140, 145 to the at least one item of reference-trajectory information carried out, to determine pothole information that gives an indication as to whether or not a pothole is present in the section of the roadway.

According to one exemplary embodiment, the reference-trajectory information represents a movement of the reference vehicle in the section when the section has no pothole. In this case, the pothole information indicates a pothole when the comparison, carried out in comparison device 562, indicates a predetermined deviation between the reference-trajectory information and respective vehicle-trajectory information 140, 145. According to one exemplary embodiment, the deviation is a deviation in relation to the y-axis, which is an indication of a circumvention of a pothole. According to a further exemplary embodiment, the deviation is a deviation in relation to the z-axis and/or one of the axes of rotation of the vehicle, which is an indication of a drive through a pothole. For example, by comparisons with different reference-trajectory information, both an avoidance of a pothole as well as travel through a pothole may be recognized on the basis of vehicle-trajectory information 140, 145.

According to one exemplary embodiment, in addition, a property of the pothole such as its size or depth is inferred from the magnitude of the respective deviation, and provided as part of the pothole information.

Alternatively, the reference-trajectory information represents a movement of the reference vehicle in the section when the section has a pothole. In this case, the pothole information indicates a pothole when the comparison, carried out in comparison device 562, indicates a predetermined agreement between the reference-trajectory information and respective vehicle-trajectory information 140, 145.

Apparatus 105 also has a provision device 566 which is configured to provide locating information 150 when, from at least two comparisons carried out for the same section of the roadway, two items of pothole information result that give an indication of a pothole located in this section. Optionally, locating information 150 includes information about a property of the pothole, if it was supplied via the pothole information.

If an exemplary embodiment includes an "and/or" link between a first feature and a second feature, this is to be read in such a way that the exemplary embodiment according to one specific embodiment has both the first feature and the second feature, and according to a further specific embodiment, has either only the first feature or only the second feature.

What is claimed is:

1. A method for locating a pothole, the method comprising:
    reading in, by a server, a first item of vehicle-trajectory information which represents a first movement of a first vehicle at a position;
    reading, by the server, in at least one second item of vehicle-trajectory information which represents a second movement of the first vehicle or of a second vehicle at the position;
    comparing, by the server, the first item of vehicle-trajectory information to at least one item of reference-trajectory information, to determine a first item of pothole information;
    comparing, by the server, the second item of vehicle-trajectory information to the at least one item of reference-trajectory information, in order to determine a second item of pothole information; and
    providing, by the server, locating information which indicates a position of a located pothole, if the first pothole information and the second pothole information indicate a pothole.

2. The method of claim 1, wherein the at least one item of reference-trajectory information represents an avoidance trajectory.

3. The method of claim 1, wherein the at least one item of reference-trajectory information represents a pothole drive-through trajectory.

4. The method of claim 1, wherein the first item of vehicle-trajectory information and/or the second item of vehicle-trajectory information represents vehicle-trajectory information, and wherein the vehicle trajectory information is determined by performing the following:
    reading in at least one item of the inertial information from an inertial sensor of a vehicle that indicates at least one parameter of a movement of the vehicle during travel, the at least one item of inertial information including at least one of: a velocity of the vehicle, or an acceleration of the vehicle;
    reading in the location information from at least one of: a position sensor of the vehicle, or a navigation system of the vehicle; which indicates the position of the vehicle during the movement; and
    determining the vehicle-trajectory information using the inertial information and the location information, the vehicle-trajectory information representing the movement of the vehicle at the position.

5. The method of claim 4, wherein the at least one parameter indicates a horizontal movement of the vehicle.

6. The method of claim 4, wherein the at least one parameter indicates a vertical movement of the vehicle.

7. The method of claim 4, wherein the at least one parameter indicates at least one of: a horizontal movement of the vehicle, or a vertical movement of the vehicle.

8. The method of claim 4, wherein the reading in the at least one item of inertial information from the inertial sensor is separate from the reading in the location information from the at least one of the position sensor of the vehicle or the navigation system of the vehicle.

9. The method of claim 1, further comprising receiving, by the server from the first vehicle, the determined vehicle-trajectory information.

10. The method of claim 1, further comprising transmitting, by the server vehicle, locating information which indicates a position of a located pothole.

11. The method of claim 10, further comprising outputting a warning regarding the located pothole, where the warning includes at least one of: an acoustic warning, or a visual warning.

12. The method of claim 1, wherein the reading in, by the server, of the first item of vehicle-trajectory information includes receiving a transmission of the first item of vehicle-trajectory information from the first vehicle, and
    the reading in, by the server, of the second item of vehicle-trajectory information includes receiving a transmission of the second item of vehicle-trajectory information from the second vehicle.

13. The method of claim 12, wherein the providing, by the server, the locating information which indicates the position of the located pothole includes transmitting the locating information to a third vehicle.

14. The method of claim 1, wherein the at least one item of reference-trajectory information represents at least one of: an avoidance trajectory, or a pothole drive-through trajectory.

15. The method of claim 14, wherein the first item of pothole information indicates the pothole if the first item of vehicle-trajectory information agrees with the reference-trajectory information in the comparison, and the second item of pothole information indicates the pothole if the second item of vehicle-trajectory information agrees with the reference-trajectory information in the comparison.

16. An apparatus for providing vehicle-trajectory information, comprising:
    a device configured to perform the following:
        reading in a first item of vehicle-trajectory information which represents a first movement of a first vehicle at a position;
        reading in at least one second item of vehicle-trajectory information which represents a second movement of the first vehicle or of a second vehicle at the position;
        comparing the first item of vehicle-trajectory information to at least one item of reference-trajectory information, to determine a first item of pothole information;

comparing the second item of vehicle-trajectory information to the at least one item of reference-trajectory information, in order to determine a second item of pothole information; and providing locating information which indicates a position of a located pothole, if the first pothole information and the second pothole information indicate a pothole.

17. The apparatus of claim 16, wherein the at least one item of reference-trajectory information represents at least one of: an avoidance trajectory, or a pothole drive-through trajectory.

18. The apparatus of claim 17, wherein the first item of pothole information indicates the pothole if the first item of vehicle-trajectory information agrees with the reference-trajectory information in the comparison, and the second item of pothole information indicates the pothole if the second item of vehicle-trajectory information agrees with the reference-trajectory information in the comparison.

19. A non-transitory computer readable medium having a computer program, which is executable by a processor to cause a method for providing vehicle-trajectory information to be performed, the method comprising:

reading in a first item of vehicle-trajectory information which represents a first movement of a first vehicle at a position;

reading in at least one second item of vehicle-trajectory information which represents a second movement of the first vehicle or of a second vehicle at the position;

comparing the first item of vehicle-trajectory information to at least one item of reference-trajectory information, to determine a first item of pothole information;

comparing the second item of vehicle-trajectory information to the at least one item of reference-trajectory information, in order to determine a second item of pothole information; and providing locating information which indicates a position of a located pothole, if the first pothole information and the second pothole information indicate a pothole.

20. The non-transitory computer readable medium of claim 19, wherein the at least one item of reference-trajectory information represents at least one of: an avoidance trajectory, or a pothole drive-through trajectory.

* * * * *